United States Patent Office 2,746,867
Patented May 22, 1956

2,746,867

SOYBEAN OIL REFINING PROCESS

Emil F. Werly, Minneapolis, Minn., assignor to Pillsbury Mills, Inc., Minneapolis, Minn., a corporation of Delaware No Drawing. Application March 10, 1952,
Serial No. 275,859

4 Claims. (Cl. 99—118)

This invention relates to a simplified process for refining soybean oil so as to make an edible product which is nutritious, flavorsome and non-reverting.

Soybean oil has been used for edible purposes for many years by western civilization and for countless centuries by oriental civilization. The orientals used crude methods of processing the soybean to obtain the oil by methods largely consisting of mechanically expressing the oil from the bean. This oil was found to have good keeping qualities, being non-reverting in nature, but having a dark color and a rather strong odor and taste which has been considered unpalatable and undesirable by western standards. In attempting to make of soybean oil a product which would have light color, bland flavor, and non-reverting characteristics, many processes have been applied to the crude soybean oil. Since the art of refining vegetable oils has attained a high degree of development the thinking of technicians skilled in the art of refining oils has been in the direction of applying previously well-known methods to the refining of soybean oil. In addition to these well-known methods, more steps and a new array of chemicals have been devised for the specific purpose of improving the soybean oil even after it has already been subjected to a multiplicity of steps and chemical treatments. Generally the light colored refined oil, after having been subjected to harsh treatment by the conventional methods, has at first a bland and agreeable flavor which reverts after standing for a period of weeks and sometimes for only days or hours. The reversion as thus experienced carries the oil through a series of flavor changes sometimes described as "grassy," "fishy" and "painty."

Another bad effect of the harsh treatment which conventional methods impart to the soybean oil is that of destroying vitamins and valuable food products which are normal constituents of the crude soybean oil. It appears that manufacturers have sacrificed much of the keeping properties and food value of the oil to obtain a light colored product. The minds of purchasers seem to have associated an unadulterated and pure oil with a light color. This, of course, is far from true since the coloring of soybean oil is largely due to the carotene, chlorophyllin and phosphatide products contained therein. The inventor therefore has reasoned that if the natural preservative properties of the crude soybean oil could be maintained and the color only partly lightened while maintaining pleasing bland flavor without danger of reversion, he could actually shorten and cheapen the treatment and still accomplish the production of a superior edible oil.

It is therefore a main object of this invention to obtain a bland and stable soybean oil with a minimum of handling and treatment during a simple and speedy refining process.

It is another object of the invention to eliminate, curtail or modify most of the steps in conventional vegetable oil refining processes so as to gain superior results through economical processing of crude soybean oil.

It is a further object of this invention to utilize the naturally occurring phosphatides together with other naturally occurring anti-oxidant constituents of the crude soybean oil reduced to a quantity somewhat less than that occurring in the crude oil but controlled so as not to be eliminated completely, whereby an edible soybean oil product of superior keeping qualities, flavor and controlled color may be obtained.

It is a still further object of the invention to limit and control the degumming of the crude soybean oil and to follow this operation by a normal steam deodorization process carried on under moderate temperature and high vacuum so as to produce a color-controlled bland flavored and stable oil contained in large measure in the natural food and vitamin components of the crude oil.

The conventional steps in vegetable oil refining are as follows:

The first step in refining such vegetable oils as cottonseed, peanut, corn oil, and soybean oil may be degumming. This degumming process may be carried out either at the extraction mill or by the refiner. There are several phosphatides found in vegetable oils of which lecithin, cephalin and inositol phosphatide appear to predominate. These phosphatides give the oil a rather strong and bitter flavor sometimes classified as "beany." This is one of the natural flavor characteristics which is objectionable in this country but does not appear to be a serious consideration elsewhere, especially in Oriental countries. The phosphatides and other minor constituents lend a dark color to the oil and may be easily removed by this conventional process in which water or a weak salt solution is added to the oil followed by agitation to create hydrated, mucilaginous globules which may be subsequently removed from the oil by such treatment as centrifuging. It has been generally thought that it is desirable to remove as much of the phosphatides as possible and that if they were not completely removed the processor was careless in his refining operation. A further incentive to the complete removal of the phosphatides has been the good market value of crude lecithin as a by-product for sale in non-related fields such as for use as an emulsifying agent in manufacturing chocolate confections and so forth. It is well known that degummed soybean oil is not stable and will revert over a period of time, finally becoming rancid. Some authorities on the reversion of soybean oil have blamed the reversion properties at least partially upon the presence of traces of lecithin together with other substances in the oil and have thought that in order to acquire a completely non-reverting oil all the phosphatides must be removed.

The second step in conventional vegetable oil refining is the alkali neutralization of the product to remove free fatty acids. This neutralization is accomplished by treating the oil with a water solution of sodium hydroxide, sodium carbonate or other alkaline reagent. Vegetable oils in general contain from about one-half to five per cent fatty acids and these are substantially removed in the form of a soap produced from the reaction of the base with the acids. The soap thus formed may be removed from the oil by allowing it to settle out or by such other process as centrifuging. An average of .03 to .08 per cent fatty acids are left in the neutralized oil. It is then the general practice to finish this step by washing several times to remove all traces of soap and then drying the oil to remove any dissolved or emulsified water which may be present in the vegetable oil.

The third conventional step in refining vegetable oils is the bleaching step. Bleaching is done to remove pigments remaining in the oil such as carotenoids and chlorophyll. The bleaching operation is usually carried on at an elevated temperature in the presence of an activated earth such as fuller's earth, diatomaceous earth, or with activated carbon. The temperatures employed are usually in the neighborhood of 180 to 250° F. and the process may be carried out under vacuum. As a final portion of the bleaching step, the earths, together with their pigment products adsorbed thereupon, are filtered out. Because of activation and breakdown of certain constituents of the oil during bleaching, some fatty acid products split off and bring back the acid value to about double that at the end of the neutralization process. The bleaching process and neutralization process are quite drastic in their chemical effect upon the vegetable oil and many of the minor constituents undergo complete chemical change, and may even be removed completely.

The next step in conventional refining is that of deodorizing. This is the most important of all the steps in refining edible vegetable oils and is carried on by the introduction of live steam into the oil which is maintained under a high vacuum, and at elevated temperature. An example of an ordinary batch operation is 20,000 pounds of oil at 450° F. maintained under an absolute vacuum of from 6 to 8 millimeters pressure. The treatment usually lasts from three to six hours. Since free fatty acids are generally more volatile than the glyceryl triesters of fatty acids such comprise the bulk of the constituents of the vegetable oil they will also distill from the product during the steam deodorizing step. Thus, the fatty acids, which increased to about double during the bleaching process, will again fall back to around .04 per cent. The color of the oil is generally further improved because of the distillation or destruction of some of the pigmented constituents. If an appreciable quantity of lecithin remained, however, treating the oil at this high temperature of 450° F. would darken the product. In most vegetable oils it is deemed necessary to have both neutralization and steam deodorization in order to remove most of the free fatty acids. This is done because the free fatty acids have been suspected of assisting in the reversion of the oil and for the further reason that the presence of any substantial amount of free fatty acid will cause smoking of the vegetable oil when it is used in cooking, and especially for deep-fat frying.

In conventional refining sometimes an optional additional step may be taken where it is desired to use the edible oil in refrigerated form. For example, where the oil is kept in a kitchen refrigerator certain constituents may coagulate upon chilling and the purchaser of the product is misled into believing that the product is inferior because of the presence of cloudy substances. This optional step therefore is taken to remove such coagulents by "winterizing," which is similar to the dewaxing process used in refining mineral oils. The coagulated products may then be removed by such process as filtration.

My invention stems from experiments designed to prove that soybean oil has in the past been over-processed rather than under-processed. In keeping with this concept a number of experiments were run, all with the object in view of treating the oil as gently as possible and to remove as little of the anti-oxidant materials as possible. It was also hoped that a simplified process could be evolved from the experiments. As a result of my experimentation both surprising and unpredictable results were obtained way beyond my expectations. As a consequence, I was able to prepare a non-reverting soybean oil having a bland flavor and a color suitable for most purposes. This was accomplished by leaving amounts of phosphatides and fatty acids in the refined oil which would normally be considered fatal to the keeping property. As a matter of fact, in one of the successful samples prepared the steam deodorization process was carried out at such a low temperature as to remove substantially none of the fatty acids. Still the sample remained non-reverting after months of storage under average conditions.

More specifically in the practice of my invention I have eliminated all but two of the conventional steps in the refining of soybean oil, and these have been so modified and controlled as to give predetermined results although using standard equipment in the processing.

The first of my two steps is that of degumming, which may be carried out in the same equipment and in a similar manner to that done in conventional refining processes. The specific modification which I have made in the art of degumming is that of controlling the degree to which the oil is degummed. As previously pointed out it has been generally supposed that complete removal of phosphatides is not only desirable but actually necessary to prevent reversion of the oil and to give it the bland flavor desired. Since the phosphatides themselves have a disagreeable taste it was thought that complete removal was also essential from this standpoint. I have found, however, that partial removal of the phosphatides will greatly improve the flavor insofar as the bitter flavor contribution of these constituents is concerned, so as to give a pleasant tasting product which has a characteristic flavor not quite as bland as the completely refined oil immediately after the conventional refining process, but on the other hand, not nearly as strong and bitter as the unrefined crude oil. Whereas in the ordinary degumming operation an excess of water is added, I prefer to use controlled quantities of water and to run frequent controls on the phosphatide content of the product in order to maintain the proper degree of degumming. The phosphatides which are dissolved in the crude oil become a mucilaginous coagulent when hydrated with water. The temperature to which the mixture is heated during my partial degumming operation varies from 120 to 180° F. The gums which are hydrated form a coagulent which may settle out in the kettle and be withdrawn, or the coagulent may be formed and removed in a continuous manner by passing oil and water through proportioning pumps into a mixing line followed by treatment in appropriate heat exchangers, then finally separated in a centrifuge. Because of the amorphous gummy nature of the phosphatide product filtration is not a suitable process for the separation. Instead of using pure water I may also use a mild solution of an acid, base or salt. These weak water solutions have all been used in the past but with the object in view of obtaining as complete degumming as practicable. As to the manner and degree of control which I exercise over the partial degumming operation I may firstly alter the quantity of water used to hydrate the gums, or secondly, select a different temperature at which to heat the water-oil mixture, since a higher temperature causes more complete hydration. As a third method of controlling the degree of degumming I may vary the speed of the separation mechanism, such as a centrifuge, so as to get greater or lesser separation of the hydrated phosphatides. Fourthly, I may vary the rate at which the hydrated oil is passed through the centrifuge. Fifthly, I may repeat the degumming operation for several times but without completely removing the phosphatides at the end of the series of treatments.

There is no practical way known to me whereby the remaining quantity of phosphatides can be measured directly. I find that the most convenient method of determining the phosphatide content is not through the measurement of phosphorous but rather through the measurement of the nitrogen content of the partially degummed oil, which is directly proportional to the phosphatide content, at least for all practical purposes in carrying out my process. Although the phosphatides may contain many complex substances, the best known are lecithin, cephalin and inositol phosphatide. Determination of the nitrogen content of crude soybean oil shows that 0.017 to 0.051 per cent nitrogen is equivalent to 1 to 3 per cent phosphatides by weight in the oil. When controlling the degree of degumming according to the five methods and variables above mentioned I standardize my procedure so as to bring the nitrogen content within outer limits of from 0.0002 to 0.0085 per cent and preferably between 0.0004 to 0.005 per cent. In terms of the phosphatide content the outer limits are equivalent to from 0.012 to 0.510 and the preferred range is from 0.024 to 0.3 per cent.

After the partial degumming operation, the oil has a milder flavor as mentioned above but still has substantially the same color as the original crude oil. The color will be somewhat improved by the next step in my process which is described below but no attempt is made to obtain a water-white oil or one even approaching such color. My purpose has been to maintain a natural color range which will produce a vegetable oil which may be used advantageously in the manufacture of margarine, salad oils, mayonnaise, salad dressings, and bakery mixes where a yellowish color is desired and where it may have been necessary in the past to actually introduce color producing materials such as food dyes.

As a part of the first step I may remove the water still existing in the partially degummed oil by any normal process which will not drastically effect or degrade the oil. It is not necessary to remove completely the water which is dissolved or present in emulsified form but from the standpoint of economy it is found cheaper to remove the water at this point than to withdraw it in the form of water vapor during the second essential step in my process which is that of steam deodorization.

This steam deodorizing step may be carried out in equipment of standard design such as is used in present day vegetable oil refining processes. In my experimentation the deodorizer consisted of a highly polished stainless steel container manufactured of steel having the formula known as "316." It was so constructed as to have a connection for attachment to a vacuum pump as is commonly used in oil refining processes. The deodorizer also was equipped with the usual inlet for the introduction of blowing steam. The factors in the art of deodorization which are ordinarily varied are time, temperature, and the quantity of blowing steam. Since the deodorizers in present use are designed for batch operation the quantity of oil placed in each batch will be a constant. Likewise, the vacuum equipment can be set to produce a certain reduced pressure which it is advantageous not to vary. I do not wish to limit myself to any particular time, temperature, or quantity of blowing steam; nor to set the exact reduced pressure, or restrict the operation to a definite poundage of oil to be treated in each batch. It is fundamental in physical chemistry that changing one of the above five factors will effect a corresponding change in one or more of the other factors. For example, if the pressure is reduced one can obtain equal evaporation at a lower temperature, with less steam, or in a shorter time. If one increases the temperature, the quantity of blowing steam can be reduced or the time of deodorization can be shortened. The only limiting factors in practicing the second step of my invention are those of avoiding such a high temperature or operating for such a length of time as will cause a degradation of constituents in the oil. From the standpoint of maximum stability and nutritional value I prefer to carry out the deodorization step within a range of from 225 to 275° F. However, if a lighter color is desired I may employ a temperature as high as 400° F. This higher temperature will destroy some of the nutritional products such as the carotenoids but will give the oil a pleasing light color. On the other hand I may employ a temperature as low as 200° F., where substantially all the nutritional properties are retained but the color producing constituents are also retained. A small amount of lecithin, as for example $\frac{1}{10}$ of a per cent, will result in practically no color additive to the color produced by the other constituents including carotenoids and chlorophyllins, even at the high temperatures noted. Greater amounts of lecithin, however, as for example 2 per cent, will cause a color change so as to deepen the resulting color at the higher temperatures. I prefer to deodorize under a reduced pressure of five millimeters absolute or less, and for a period of time in the neighborhood of four hours.

One of the surprising results I have obtained is that of producing a non-reverting oil though allowing some of the free fatty acids to remain in the deodorized oil. Here again it has been generally supposed that to produce a non-reverting oil it was necessary to remove substantially all the free fatty acids. In one of my experiments, the temperature employed was so low as to remove practically none of the free fatty acids and still the product maintained its non-reverting character after many months of shelf life. Where high temperatures in the neighborhood of 450° F. and higher are employed in deodorization of my partially degummed product the color of the oil will be altered. In conventional refining it has been customary to use the bleaching step to remove carotene and other color producing constituents. Since a lower temperature is preferred in practicing my invention the color may be controlled much more easily without removing or destroying carotene, chlorophyll or vitamins and the undesirable dark brownish color resulting from high temperature operation may be avoided completely. In any event, where my deodorization temperature is maintained between 200 and 300° F. a pleasing yellow color range is obtained. In terminology employed by oil refiners the equivalent steam treatment when given vegetable oils for the purpose of removing free fatty acids has been called "steam refining." When the purpose is primarily to remove odors and flavors, the term used is "steam deodorization." Since in no instance in the practice of my invention is the free fatty acid content materially reduced, I prefer to call my steam treatment "steam deodorization."

The products distilled from the partially degummed oil in my steam deodorization process comprise minute traces of odoriferous and flavoring substances many of which are unknown from the standpoint of chemical analysis. It is known, however, that at least some of the volatile substances which are distilled over in the steam deodorization process are known to be precursors of reversion. Opinions have differed regarding the nature of the primary factor which causes reversion. Some authorities have blamed the linolenic acid, others the unsaponifiable matter, others traces of gums and still others the presence of methyl-n-nonyl ketone. The above substances, once they begin to revert, cause the progressive flavor change mentioned earlier in this specification. It has been known that certain constituents of the soybean oil act as anti-oxidants thus helping to preserve the oil and to prevent reversion. Some of the better known anti-oxidants are tocopherols. These anti-oxidants assist in preventing the formation of precursors to reversion but of themselves are incapable of preventing ultimate reversion or of producing non-reverting oil. The tocopherol content of the crude oil is substantially reduced during every one of the conventional treatment steps. In my process a large share of the tocopherol remains in its natural state and it is able to contribute to the stabilization of the oil in whatever function it performs in so stabilizing the oil. The exact action of the anti-oxidants is not known but as a result of my experimentation it seems that a synergistic effect is obtained by the mutual action of the phosphatide content coupled with tocopherol and sterols in such a way as to prevent reversion, even with free fatty acids present as well as vitamins and other minor constituents. In an attempt to discover the nature of this anti-oxidant effect and to discover the proper proportional relationship between the various constituents left in the crude soybean oil after my treatment, I attempted to synthetically produce a non-reverting oil from a highly refined soybean oil which had been drastically treated in the conventional manner so as to remove substantially all of the coloring matter, free fatty acids, other volatile agents, vitamins, tocopherols and so forth to leave a product consisting almost entirely of the triglycerides comprising the main portion of crude soybean oil. Phosphatides, known in the trade as "commercial lecithin," were added back to this highly refined oil. This additive was selected since it would naturally contain certain other associated components the presence of which it was thought might be responsible for the effect obtained. Much to my surprise the synthetic product did not show non-reverting characteristics but on the contrary rapidly degenerated and became rancid after a short period of time. From these experiments it thus becomes apparent that some natural balance of components in the crude oil has been left by my process in such condition or proportion as to stabilize the oil. It is not known whether certain of the phosphatides hydrate more readily than others so that the remaining phosphatides after my partial degumming will have a different proportion than in the crude oil or whether the proportion of phosphatides remaining is the same as that in the crude oil. In any event there is a marked difference between the product of my two-step process and that of the completely refined oil according to conventional standards or a synthetic product simulating the make-up of my partially degummed and mildly deodorized product.

As to the manner of testing the oils there is no satisfactory quantitative method of determining the degree of reversion. It is known, however, that when a flavor or odor change occurs in a certain time period after the production of the refined oil that the reversion will continue and ultimately result in a completely unpalatable oil. A taste panel of persons sensitive to the delicate changes in flavor resulting from the precursors of reversion (before reversion actually takes place) was selected and given samples of soybean oil treated according to my procedure and under conditions varying within the limits prescribed. As one example, the crude soybean oil from solvent extraction system was degummed by treating with two per cent water. The mixture was stirred for about fifteen minutes to hydrate the phosphatides and then was heated to 140° F. The agitation was continued for about fifteen minutes more until the gums coagulated. The mixture was then passed through a centrifuge to separate the gummy substance from the oil. The degummed oil was put into a deodorizer and treated at 250° F. for four hours at 6 millimeters absolute pressure using 0.4 per cent blowing steam per hour. The soybean oil product obtained was tested by the taste panel and received a rating of "good" when it was freshly prepared and also received a rating "good" after a storage period of seven days at 60° C.

In other experiments the amounts of phosphatides remaining in the oil after the degumming operation were carefully calculated in terms of percentage of nitrogen within the limits specified above. In one of the characteristic tests the nitrogen percentage was analyzed at .00064 per cent and the temperature of the steam deodorization process was held at 250° F. for a period of four hours. After a few hours the oil was tasted by the panel of experts and a score of 7.8 was obtained from their collective test results. On the scale of 1–10 this product came within the bracket termed "good." An accelerated reversion test was then applied to the same oil by allowing it to stand for seven days at 140° F. At the end of this period the average taste panel score was 7.4 percent, still within the range termed "good." Under similar circumstances oil given the more complete and careful conventional treatment as described in detail earlier in this specification, had degraded to a score under 5 which under the taste panel system was in the bracket termed "bad." Numerous other tests using my process have been applied to the oil in which the temperature of the deodorization process has been elevated and the percentage of phosphatides remaining in the degummed oil have been varied. In all cases the taste panel score was consistently higher for the product produced by my method over that produced by the conventional refining method. In order to give the product produced by my process an extreme test, one sample was maintained for 600 days at room temperature and still showed no sign of reversion. According to the "shelf-life" expected of vegetable oils in normal retail channels, a period of 200 days is more than adequate.

It is thus seen that I have provided a new shortcut process for producing an edible soybean oil product which is more simple and economical than that obtained by conventional processes and which produces a superior product having the advantages of both crude soybean oil and highly refined oil.

Further I have found that my oil product is not only suitable in salad oils, margarine and so forth, but may be used in prepared food mixes containing wheat flour and designed for cakes, donuts, rolls and the like. Such foods in which my improved soybean oil product is used, have desirable characteristics including pleasing color and taste.

It will be understood that various changes may be made in my processes and in the various steps thereof without departure from the scope of the present invention, which generally stated consists in the matter described and set forth in the appended claims.

What I claim is:

1. A process for making a non-reverting edible product from crude soybean oil having a mixture of soluble phosphatides and free fatty acids consisting in hydrating and removing the phosphatides to reduce the content thereof to a total of between 0.023 per cent and 0.3 per cent phosphatides in the hydrated oil, and steam deodorizing at a moderate temperature not to exceed 400 degrees F. and an absolute pressure of about 5 millimeters or less to leave at least some of the free fatty acids in the product.

2. A process for making a non-reverting edible product from crude soybean oil having a mixture of soluble phosphatides and free fatty acids consisting in hydrating a portion of the phosphatides to reduce the content thereof to an aggregate weight of between .023 per cent and 0.3 percent of the weight of the oil, removing the hydrated phosphatides, and steam deodorizing the product at a temperature of between 200 to 400 degrees F. and at an absolute pressure of 5 millimeters.

3. A process for making a non-reverting and light colored edible product from crude soybean oil having a mixture of soluble phosphatides and free fatty acids consisting in hydrating and removing the phosphatides to reduce the content thereof to a total of between 0.23% and 0.3% phosphatides in the hydrated oil, and steam deodorizing at a moderate temperature between 200 degrees and 300 degrees Farenheit and at an absolute pressure of about five millimeters or less to leave at least some of the free fatty acids in the product.

4. A process for making a non-reverting edible product from crude soybean oil having a mixture of soluble phosphatides and free fatty acids consisting in hydrating and removing the phosphatides to reduce the content thereof to a total of between 0.023% and 0.3% phosphatides in the hydrated oil, and steam deodorizing under vacuum for a period of approximately four hours and at a moderate temperature not to exceed 400 degrees Farenheit so as to leave at least some of the free fatty acids in the product.

References Cited in the file of this patent

UNITED STATES PATENTS

| | | |
|---|---|---|
| 1,448,581 | Turner | Mar. 13, 1923 |
| 2,407,616 | Phelps et al. | Sept. 10, 1946 |
| 2,431,347 | Scharf | Nov. 25, 1947 |
| 2,525,702 | Mattikow | Oct. 10, 1950 |
| 2,621,197 | Thurman | Dec. 9, 1952 |

OTHER REFERENCES

Industrial Oil and Fat Products (Bailey). Published by Interscience Publishers Inc., New York, 2nd Edition (1951), page 624.